United States Patent
David

[19]

[11] Patent Number: 6,161,684

[45] Date of Patent: Dec. 19, 2000

[54] HERRINGBONE CONVEYOR BELT

[75] Inventor: Joseph S. David, Franklin, Pa.

[73] Assignee: Joy MM Delaware, Inc., Franklin, Pa.

[21] Appl. No.: 08/989,069

[22] Filed: Dec. 11, 1997

[51] Int. Cl.$^7$ .................................................. B65G 15/36

[52] U.S. Cl. ......................... 198/847; 474/260; 474/262

[58] Field of Search ............................ 198/847; 474/260, 474/261, 262

[56] References Cited

U.S. PATENT DOCUMENTS

| | | |
|---|---|---|
| 2,141,796 | 12/1938 | Loges . |
| 3,179,238 | 4/1965 | Patin . |
| 3,181,690 | 5/1965 | Jenkins . |
| 3,212,627 | 10/1965 | Beebee . |
| 3,615,152 | 10/1971 | Bouzat et al. . |
| 3,616,832 | 11/1971 | Shima et al. . |
| 4,216,856 | 8/1980 | Moring et al. . |
| 4,257,833 | 3/1981 | Jensen . |
| 4,387,801 | 6/1983 | Hoover . |
| 4,410,082 | 10/1983 | Mcginnis . |
| 4,433,777 | 2/1984 | Densmore . |
| 4,688,615 | 8/1987 | Lee . |
| 5,004,098 | 4/1991 | Marshall . |

FOREIGN PATENT DOCUMENTS 1228226  4/1971  United Kingdom .

*Primary Examiner*—Christopher P. Ellis
*Assistant Examiner*—Mark A. Deuble
*Attorney, Agent, or Firm*—Kirkpatrick & Lockhart LLP

[57] ABSTRACT

A flexible conveyor belt having layers of oppositely extending cord members which abut each other at the lateral centerline of the conveyor belt. The angle of the cord members in each successive layer may be opposed to that of the previous layer. The conveyor belt includes an elastomeric body having spaced apart edge portions and a top and bottom surface. An internal stretch limiter, such as an angularly woven fabric, is disposed in the central region of the belt along the lateral centerline of the belt. Because the angle of the cord members in each successive layer are opposed to each other, the belt is strengthened. Because the angled cord members abut each other along the lateral centerline, the sideways forces acting on the belt are negated. Because stretch limiting devices are provided along the lateral centerline, the belt may be pretensioned up to the limit of the elongation of the stretch limiter and remain under tension during use to enable the inner and outer edges to negotiate horizontal curves while retaining material thereon during the curves.

32 Claims, 4 Drawing Sheets

HERRINGBONE CONVEYOR BELT

CROSS REFERENCE TO RELATED APPLICATIONS

Not Applicable

FEDERALLY SPONSORED RESEARCH

Not Applicable

BACKGROUND OF THE INVENTION

1. Field of The Invention

The present invention relates to conveyor belts and, more particularly, to a prestretched conveyor belt having a plurality of layers of oppositely angled cord members that abut each other at the centerline of the belt and an internal stretch limiting means to allow the belt to remain in tension while traversing horizontal curves.

2. Description of the Invention Background

Elongated endless conveyor belts have been developed for traveling through a curvilinear orbit with a generally horizontally extending upper surface for carrying material overlying a generally horizontally extending lower surface. The endless belts themselves are actually composed of one or more conveyor segments that are spliced together in an end-to-end fashion to obtain an elongated conveyor belt in the shape of an endless loop. In general, such belts are stretched upon installation. This pretensioning enables the entire surface of the belt to remain in tension, while allowing the outer edge of the belt to elongate and the inner edge of the belt to shorten, as the belt negotiates a horizontal curve.

Without the incorporation of a means to limit the stretch of the belt due to pretensioning, the forces acting on the belt during use would be sufficient to cause failure in the belt after only very limited use. The incorporation of a stretch limiting means into the length of the belt restricts overstretching of the belt during use and assures that the predetermined tension is evenly distributed along the full length of the endless loop belt. The stretch limiting means thus provides stability to the belt which allows the entire length of the belt, from edge to edge, to be stretched to and maintained at a predetermined tension. Maintaining a predetermined tension throughout the length of the belt permits the inner and outer edges of the belt in a horizontal curve to experience compression and tension relative to the pretensioned state of the belt, respectively, while traveling through a horizontal curve, but to return to the predetermined tension when no longer traveling through a horizontal curve.

The need for stretching belts to aid in negotiating horizontal curves requires that they be constructed from an elastomeric material such as rubber. Such materials alone have been found to lack the lateral stiffness necessary to allow the belt to resist undue deformation while negotiating horizontal curves. Attempts to develop belts that address this concern have included various combinations of rubberized surfaces containing angled layers of reinforcing bands imbedded therein. These combinations teach that bands are positioned to run across the entire width of the belt, oriented at a given angle of bias with respect to the transverse axis of the belt.

In addition to increasing the lateral stiffness of the belt to aid in resisting undue deformation, the use of angled cords has been found to decrease the tendency of the belt to cut and tear and to add strength to the splices between belt segments. Increasing the angle of the cords increases the strength of the splices between belt segments and thus increases the overall strength of the endless belt. However, increasing the angle of bias of the cords also leads to undesirable sideways forces that work to pull the belt to either side. To maintain these forces at satisfactory levels, it has been necessary to limit the angle of bias of the bands. However, decreasing the angle necessarily weakens the splice strength between each of the connected segments in the endless loop conveyor belt and thus lowers the overall strength of the belt.

Various belt configurations have been attempted in an effort to achieve sufficient splice strength while not inducing unmanageable sideways forces. One such design discloses a belt embodying an internal stretch limiter in conjunction with a lower and an upper layer of reinforcing rods disposed across the entire width of the belt at opposing angles relative to the transverse axis of the conveyor belt. Another belt discloses a reinforced belt comprising a flexible composition such as rubber and having at least two reinforcement layers comprised of steel cords embedded within the flexible composition. The two reinforcement layers are taught to contain cords running uninterrupted across the entire width of the belt, in substantially parallel relation to one another and oriented at a given angle of bias with the transverse axis of the belt. The angle of bias of the cords in one layer is in the opposite sense to the angle of bias of the cords in an adjacent layer. Another embodiment of this belt teaches a similar belt in which two layers of equally angled uninterrupted cords are positioned at the top of the belt and two layers of oppositely angled uninterrupted cords are positioned at the bottom of the belt. Other inventions have taught conveyor belts having a longitudinal reinforcing layer and a number of transverse reinforcing layers constituted by parallel elements spanning the entire width of the belt that are inclined with respect to the median plane of the belt.

Each of these belt designs falls prey to one or more of the above-mentioned problems related to sideways forces and splice strength. Likewise, not all of the references detailed above adequately address the need for the belt to be able to both trough and maintain tension while traversing a horizontal curve. In particular, each of the references above finds it necessary to limit the angle of bias in order to maintain sideways forces at manageable levels. However, as mentioned above, reducing this angle also reduces the overall strength of the belt and, in particular, reduces the resistance of the belt to tearing.

The subject invention is thus directed toward an improved conveyor belt which addresses, among others, the above-discussed needs and provides a conveyor belt that has superior tear resistance and splice strength, a design that negates the build-up of sideways forces during operation due to cord angle and maintains the ability to both trough to provide for retention of material thereon and remain in tension across its entire width while traversing horizontal curves.

SUMMARY OF THE INVENTION

In accordance with a preferred form of the present invention, there is provided an endless conveyor belt capable of traversing horizontal curves in its path while allowing for retention of the material being conveyed thereon. The conveyor belt disclosed herein includes one or more layers, with each layer having oppositely angled cord members which abut one another at the lateral centerline of the belt. In each layer, the angles of the cord members on one side of the lateral centerline are equally opposed to the angles of the cord members of the other side of the lateral centerline with which they abut.

An internal stretch limiting means is provided with the cord layer or layers. The internal stretch limiting means comprises a woven material that has the property of stretching or elongating a predetermined distance when subject to tension and then having a rapidly increasing resistance to further elongation of the belt in operation. An intermediate layer, contiguous to the stretch limiter, is also disposed to separate the layers.

By virtue of the provision of the internal stretch limiting means, the instant conveyor belt may be driven by conventional drive rollers without the necessity for a supplemental drive belt or a comparatively noisy drive chain means, both of which are known in the art. In addition, because the stretch limiting means is disposed along the centerline of the belt, the belt as a whole may be adjusted so as to maintain tension along the inner edge of the belt while it traverses horizontal curves in its path, but will allow the outer edge to elongate to allow the belt to negotiate the curve.

Accordingly, the present invention provides solutions to the aforementioned problems associated with existing pre-tensioned conveyor belts. The reader will appreciate that these and other details, objects and advantages will become apparent as the following detailed description of the present preferred embodiments thereof proceeds.

BRIEF DESCRIPTION OF THE DRAWINGS

In the accompanying drawings, preferred embodiments of the present invention are shown, wherein like reference numerals are employed to designate like parts and wherein.

DETAILED DESCRIPTION OF THE PREFERRED EMBODIMENTS

Figure 1:
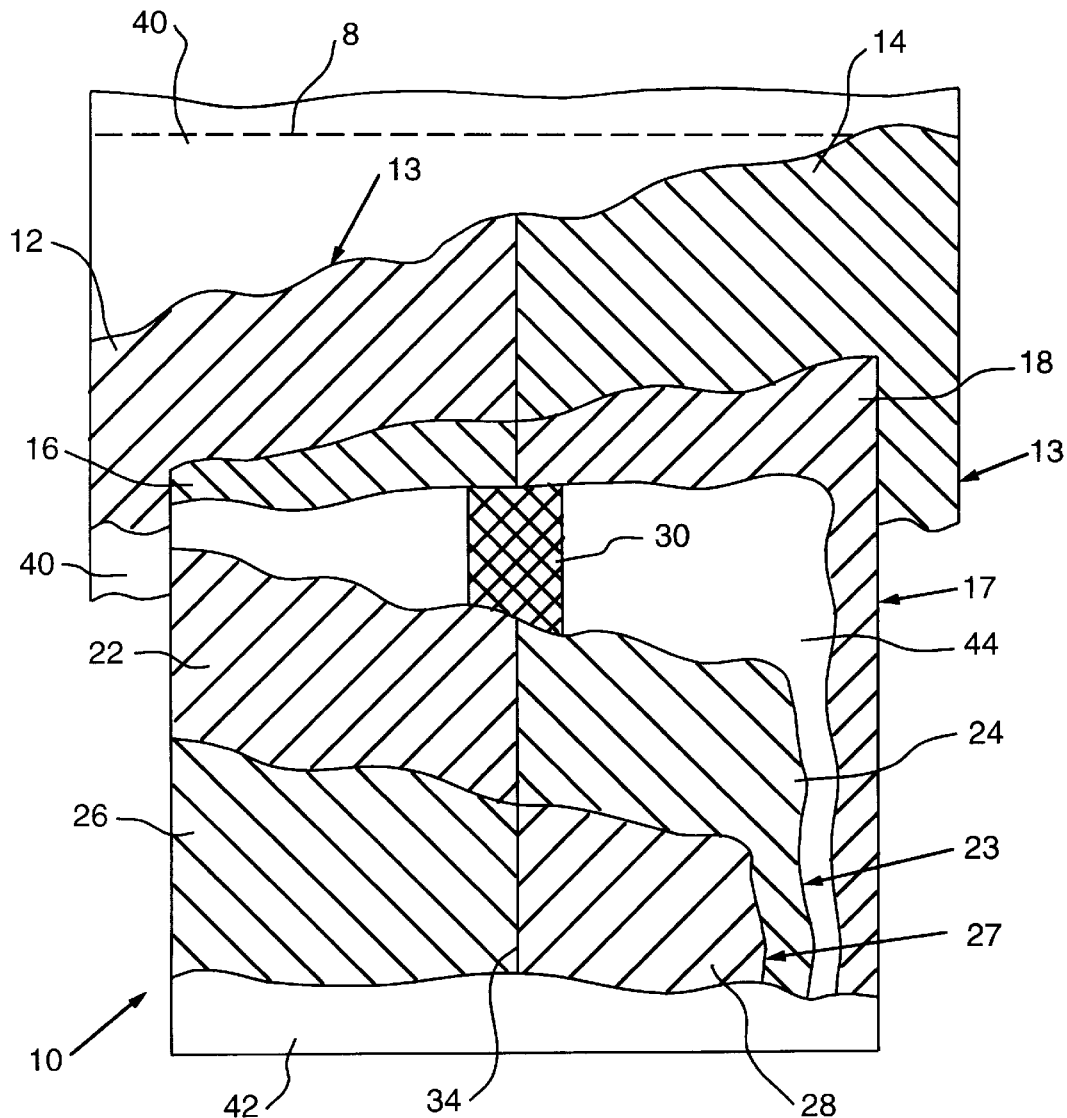
FIG. 1 is a cut-away top view from of a portion of the endless conveyor belt according to the present invention.
Figure 2:
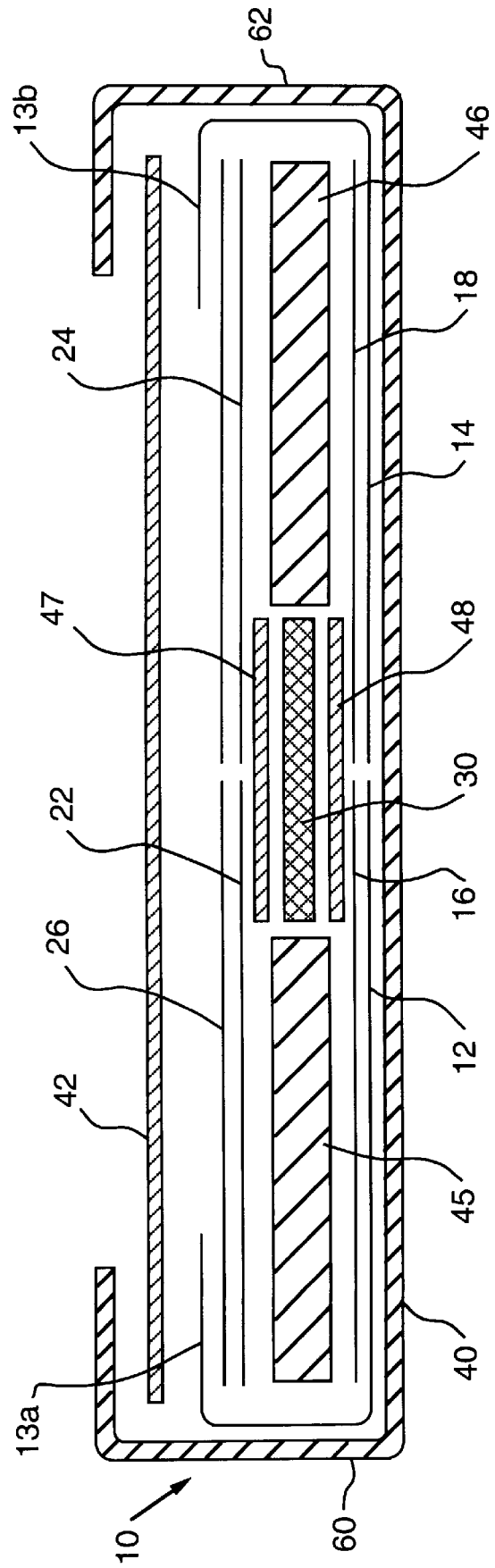
FIG. 2 is a cross-sectional view of the endless conveyor belt according to the present invention.
Figure 3:
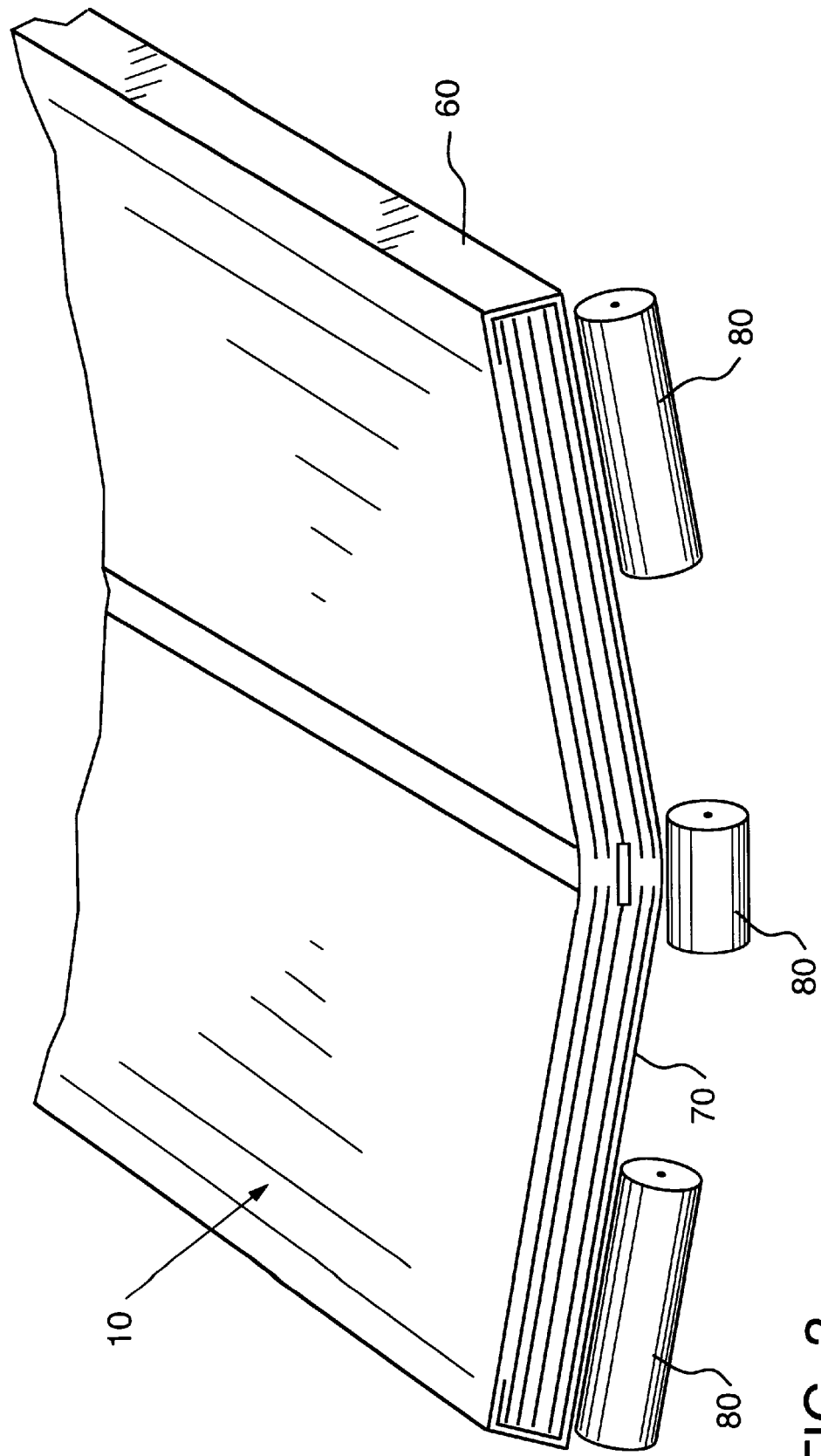
FIG. 3 is an isometric view of the endless conveyor belt in use on a conveyor apparatus.

Referring now to the drawings for the purposes of illustrating preferred embodiments of the invention only, and not for purposes of limiting the same, the Figures show an endless conveyor belt. More particularly and with reference to FIGS. 1–3, the conveyor belt is shown generally at 10.

As is known in the prior art, conveyor belts may be formed from materials such as natural rubber or various rubber compounds such as neoprene, which materials will be referred to herein as "rubber", as well as reinforcing materials. Conveyor belts, such as those previously known in the art, and the conveyor belt 10 of the present invention, commonly comprise one or more belt sections joined at each end to an end of an adjacent belt section (or to itself in the case of a single belt section) by means of a connection commonly referred to as a splice. By splicing together one or more belt sections, it is possible to form an elongated endless conveyor belt 10. The endless conveyor belt 10 includes a lower surface 70 which may be engaged by driving and/or support rolls and an upper surface 72 on which material to be conveyed may be deposited. In operation, the end portions, which define the portion of the endless belt 10 that lies between the upper 72 and lower 70 conveying surfaces, travel over belt reversing end rollers. The end rollers may be driven, and thus by way of frictional contact with the belt 10, serve to power the belt 10. Additional rollers 80 may be provided along the length of the belt 10 and may cause the belt 10 to traverse a varied horizontal and vertical path. Such a path may additionally include horizontal curves. These rollers 80 may include side rollers to deflect the lateral edges 60 and 62 of the belt 10 while traversing horizontal curves and support rollers to aid in troughing of the belt and better retention of the materials deposited in the central portion 32 thereof.

A preferred embodiment of the present conveyor belt apparatus 10 includes a bottom portion 40, preferably made from vulcanizable rubber. A first layer of cords 13 is disposed upon the bottom portion 40. In the preferred embodiment, these cords are comprised of stranded polyester. The first layer of cords 13 is comprised of two oppositely angled cord members 12 and 14 which abut each other at the lateral centerline 34 of the belt 10. The first layer of cords 13 and the bottom portion 40 are wider than the width of the overall belt 10. As such, the excess width 13$a$ and 13$b$ of the first layer of cords 13 and the excess width of the bottom portion 40 are wrapped above the other cord layers 17, 23 and 27, as described further below. By equally opposing the angle of the cord members 12 and 14, the sideways forces acting on the belt 10 in both directions are balanced. As such, the net force acting on the belt 10 in either direction is reduced to zero and the angle of the cord members may be increased without also inducing undesirable sideways forces. The preferred angle for the cord members 12 and 14 is 15° from the transverse axis 8 of the belt 10. Because the cord members are oppositely angled, cord member 12 would preferably be disposed at an angle of 15° above the transverse axis 8, while cord member 14 would preferable be disposed at an angle of 15° below the transverse axis 8. This positioning of the cord members defines an included angle of 30° between the adjacent cord members of layers 12 and 14. In alternative embodiments, the included angle may be increased or decreased to meet other requirements of the environment in which the belt 10 is used. As mentioned herein, increasing the angle of the cord members results in a stronger splice and an increased resistance to incidental tearing. By equally opposing the angles of the cords of cord members 12 and 14, the sideways forces acting on the belt 10 are equal in either direction are balanced. Thus, the sideways force acting on the belt are negated such that the net sideways forces acting on the belt are zero.

A second layer of cords 17 may be disposed above the first layer of cords 13, and comprises oppositely extending cord members 16 and 18 which abut each other at the lateral centerline 34 of the belt 10. Once again, by equally opposing the angle of the cord members 16 and 18, the sideways forces acting on the belt 10 in both directions are balanced. As such, the net force acting on the belt 10 in either direction is reduced to zero and the angle of the cord members may be increased without also inducing undesirable sideways forces. As mentioned herein, increasing the angle of the cord members results in a stronger splice and an increased resistance to incidental tearing. In the preferred embodiment, cord member 16 is 15° below the transverse axis 8 and cord member 18 is 15° above the transverse axis 8. This positioning of the cord members defines an included angle of 30° between the adjacent cord members of layers 13 and 17. In alternative embodiments, the included angle may be increased or decreased to meet other requirements of the environment in which the belt 10 is used.

It should be noted that in alternative embodiments, the angles of the adjacent cord members in layers 13 and 17 need not necessarily be equal and opposite. In the preferred embodiment, this configuration is desired due to ease of manufacture only. However, in operation, the benefits of this invention will still be realized if the angles of the adjacent cord members in layers 13 and 17 are different, as long as the angles of cord members 12 and 14 in layer 13 and cord members 16 and 18 in layer 17 respectively are equal and opposite.

An intermediate portion 44 is disposed immediately above the second layer 17. The intermediate portion 44 comprises two members of vulcanizable rubber 45 and 46 divided down the lateral centerline 34 by an internal stretch limiter 30. As needed, additional strips of vulcanizable rubber 47 and 48 may be placed above and below the internal stretch limiter 30 so that the intermediate portion 44 is of uniform cross-sectional thickness throughout. In the preferred embodiment, the members comprising the intermediate portion 45, 46, 47 and 48 are joined by a process of vulcanization, so as to surround and conform to the shape of the internal stretch limiter 30 without filling the weave of the internal stretch limiter 30 with rubber and thereby diminishing its stretch limiting characteristics. The thickness of the intermediate layer, and thus the amount of separation between the pairs of layers 13 and 17 (referred to above) and 23 and 27 (referred to below) determines the resistance that the belt 10 will have to bending in the cross-sectional plane and may be varied accordingly to meet environment in which the belt is used and the material to be carried thereon.

Figure 4:
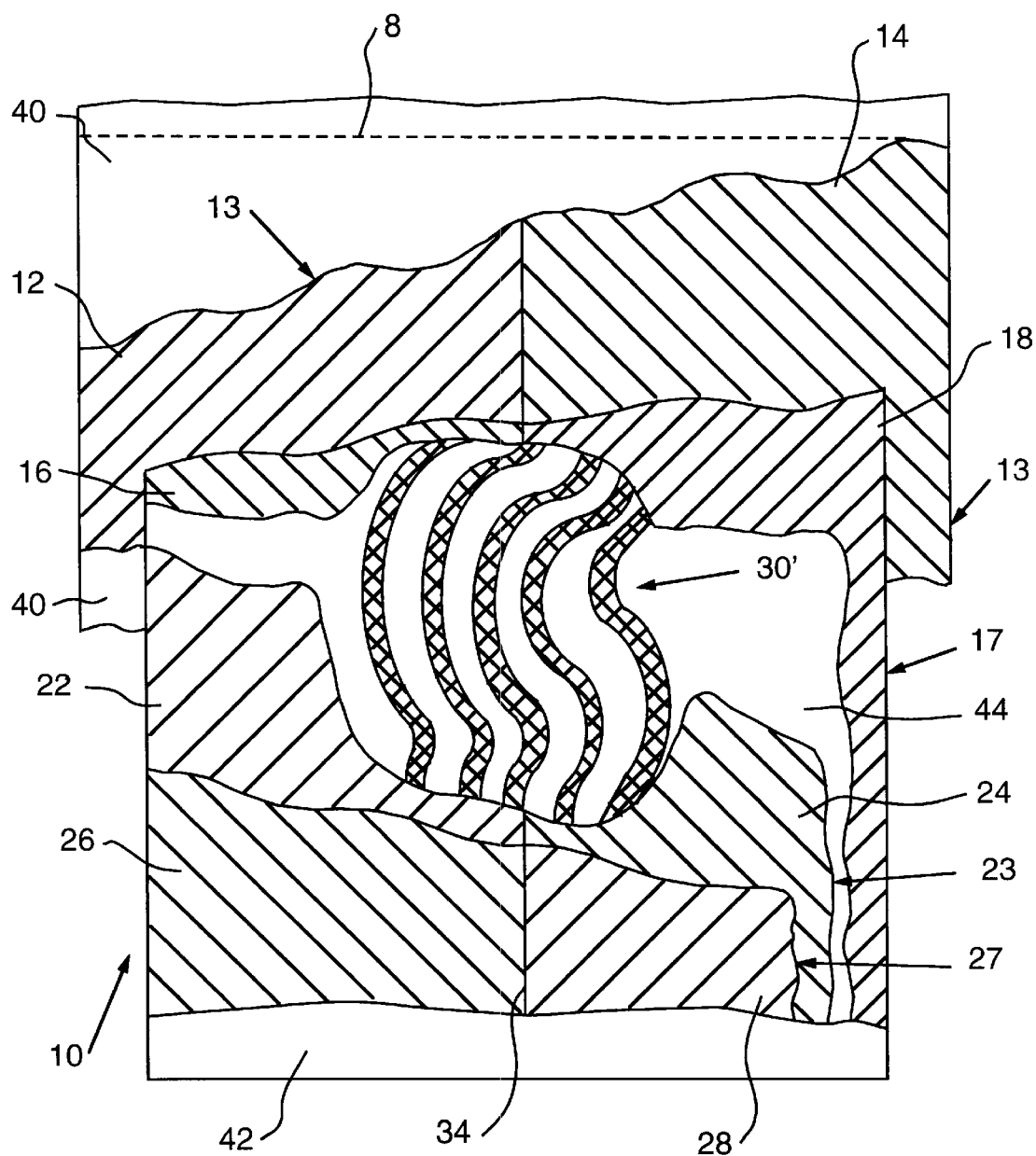
FIG. 4 is a cut-away top view of a portion of another endless conveyor belt according to the present invention.

The internal stretch limiter 30 is preferably disposed along the lateral centerline of the belt 10 and is comprised of cross or angularly woven high strength fibers. Stretch limiter 30 may comprise a tube which is flattened when formed into the belt 10. Preferably, the woven fibers or tube is formed of an aramid fiber such as that sold under the trademark KEVLAR® by E.I. DuPont de Nemours & Company. The weave of the stretch limiter 30 has the property of elongating a predetermined distance when subject to tension during the initial stretching of the belt 10, and then its resistance to further elongation increases rapidly to resist any further appreciable stretching of the belt 10 in operation. Preferably, the internal stretch limiter 30 has a width substantially less than that of the width of the belt 10. In the preferred embodiment the width of the internal stretch limiter 30 is 12% of the width of the belt 10. Alternatively, the internal stretch limiter 30 may be disposed in various patterns along the lateral centerline of the belt 10, such as a sinusoidal wave, a square wave, or a combination of the two wave forms. FIG. 4 illustrates a stretch limiter 30' in the form of a sinusoidal wave.

In a preferred embodiment, a third layer of cords 23 may also be provided, disposed above the intermediate layer 44. The third layer 23 comprises opposed cord members 22 and 24 which abut each other at the lateral centerline 34 of the belt 10. The preferred angle for the cord members 22 and 24 is 15° from the transverse axis 8 of the belt 10. Because the cord members are oppositely angled, cord member 22 would be at an angle of 15° above the transverse axis 8, while cord member 24 would be at an angle of 15° below the transverse axis 8. This positioning of the cord members defines an included angle of 30°. In alternative embodiments, the included angle may be increased or decreased to meet other requirements of the environment in which the belt is used. As with the other layers, by equally opposing the angle of the cord members 22 and 24, the sideways forces acting on the belt 10 in both directions are balanced. Thus, the net force acting on the belt in either direction is reduced to zero. As such, the angle of the cord members may be increased without also increasing the sideways forces, resulting in the stronger splice strength and a greater resistance to incidental tearing, without the creation of unmanageable sideways forces.

A fourth layer of cords 27 is preferably disposed above the third layer of cords 23. The fourth layer 27 is comprised of opposed cord members 26 and 28 which abut each other at the lateral centerline 34 of the belt 10. As with the other layers, by equally opposing the angle of the cord members 26 and 28, the sideways forces acting on the belt 10 in both directions are balanced. Thus, the net force acting on the belt in either direction is reduced to zero. As such, the angle of the cord members may be increased without also increasing the sideways forces, resulting in the stronger splice strength and a greater resistance to incidental tearing, without the creation of unmanageable sideways forces. In the preferred embodiment, cord member 26 is 15° below the transverse axis and cord member 28 is 15° above the transverse axis. This positioning of the cord members defines an included angle of 30°. In alternative embodiments, the included angle may be increased or decreased to meet other requirements of the environment in which the belt is used.

It should be noted that in alternative embodiments, the angles of the adjacent cord members in layers 23 and 27 need not necessarily be equal and opposite. In addition, the angles of the cord members 13, 17, 23 and 27 need not be equal and opposite. In the preferred embodiment, this configuration is desired due to ease of manufacture only. However, in operation, the benefits of this invention will still be realized if the angles of the adjacent cord members in layers 23 and 27 are different, as long as the angles of the abutting cord members in each individual layer are equal and opposite.

A top portion 42 is provided atop all of the other layers in the belt 10. Further, sides 60 and 62, extending between the top and bottom portions, are also provided. The top portion 42 sides 60 and 62 are preferably made from vulcanizable rubber.

In fabrication of the preferred embodiment of belt 10, the layers are assembled as indicated herein, the excess width 13a and 13b of the first layer 12 is wrapped around the second 17, third 23 and fourth 27 layers. The additional excess width 13a and 13b of the first layer 12 is then folded over the top of the belt 10 and the top layer 42 is applied. The excess width of the bottom portion 40 is then folded over the second 17, third 23, fourth 27 and top 42 layers to form the sides 60 and 62 of the belt and the entire belt is vulcanized by conventional practices.

In alternative embodiments, additional layers of opposed cord members may be provided in the belt 10. Additionally, intermediate layers may also be provided. The number of cord layers and the cord diameter may be varied, to adapt the belt for use in various situations and for carrying various materials, without affecting the basic invention described herein, so long as each cord member is matched by an equally opposed cord member, as described herein, such that the sideways forces acting on the belt 10 are canceled.

Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims.

What is claimed is:

1. A flexible conveyor belt, comprising:
    a first layer of rubber material;
    a first cord layer disposed adjacent to the first rubber layer and comprising two oppositely biased first cord members the ends of which contact each other at the lateral centerline of the belt, with one first cord member on one side of the lateral centerline of the belt biased at an angle A with the lateral axis of the belt, and the other first cord member biased at an angle −A with the lateral axis of the belt; and a second layer of rubber material disposed on the opposite side of said first cord layer than said first rubber layer.

2. The conveyor belt of claim 1, further comprising:

an internal stretch limiter oriented along the lateral centerline of the belt adjacent to first cord layer and having the property of stretching a predetermined distance when subject to tension and then having a rapidly increasing resistance to further elongation of the belt in operation.

3. The conveyor belt of claim 2, wherein the internal stretch limiter is disposed in a sinusoidal pattern along the lateral centerline of the belt.

4. The conveyor belt of claim 2, wherein the internal stretch limiter comprises woven fabric.

5. The conveyor belt of claim 2, further comprising, an intermediate rubber layer, positioned adjacent to the internal stretch limiter.

6. The conveyor belt of claim 5, wherein the intermediate layer comprises vulcanizable rubber.

7. The conveyor belt of claim 1, wherein the angle of A is approximately 15°.

8. A flexible conveyor belt, comprising:

a first layer of rubber material;

a first cord layer disposed adjacent to the first rubber layer and comprising two oppositely biased first cord members which abut each other at the lateral centerline of the belt, with one first cord member on one side of the lateral centerline of the belt biased at an angle A with the lateral axis of the belt, and the other first cord member biased at an angle −A with the lateral axis of the belt;

a second cord layer between the first cord layer and the second rubber layer and comprising two oppositely biased second cord members abutting each other at the lateral centerline of the belt, with one second cord member on the one side of the centerline of the belt biased at an angle −B with the lateral axis of the belt, and the other second cord member biased at an angle B with the lateral axis of the belt; and a second layer of rubber material disposed on the opposite side of said first cord layer than said first rubber layer.

9. The conveyor belt of claim 8, further comprising:

an internal stretch limiter oriented along the lateral centerline of the belt adjacent to second cord layer and having the property of stretching a predetermined distance when subject to tension and then having a rapidly increasing resistance to further elongation of the belt in operation.

10. The conveyor belt of claim 9, wherein the internal stretch limiter is disposed in a sinusoidal pattern along the lateral centerline of the belt.

11. The conveyor belt of claim 9, wherein the internal stretch limiter comprises woven fabric.

12. The conveyor belt of claim 9, further comprising, an intermediate rubber layer, positioned adjacent to the internal stretch limiter.

13. The conveyor belt of claim 12, wherein the intermediate layer comprises vulcanizable rubber.

14. The conveyor belt of claim 8, wherein angle A is equal to angle B.

15. The conveyor belt of claim 8, wherein angle A is not equal to angle B.

16. The conveyor belt of claim 8, wherein the angle A and B are approximately 15°.

17. The conveyor belt of claim 8, further comprising an elongated elastomeric body having spaced-apart edges, edge portions along the edges, a load-carrying top belt surface on one side of the body extending between the edges and a drivable bottom belt surface on the other side of the body, extending between the edges.

18. The conveyor belt of claim 17, wherein the elongated body is comprised of vulcanizable rubber.

19. The conveyor belt of claim 8, further comprising:

a third cord layer disposed between said second cord layer and said second rubber layer and comprising two oppositely biased third cord members abutting each other at the lateral centerline of the belt with one third cord member on the one side of the centerline of the belt biased at an angle C with the lateral axis of the belt and the other third cord member biased at an angle −C with the lateral axis of the belt; and a fourth cord layer disposed between the third cord layer and the second rubber layer comprising two oppositely biased fourth cord members abutting each other at the lateral centerline of the belt with one fourth cord member on the one side of the centerline of the belt biased at an angle −D with the lateral axis of the belt and the other fourth cord member biased at an angle D with the lateral axis of the belt.

20. The conveyor belt of claim 19, further comprising:

an internal stretch limiter oriented along the lateral centerline of the belt adjacent to third cord layer and having the property of stretching a predetermined distance when subject to tension and then having a rapidly increasing resistance to further elongation of the belt in operation.

21. The conveyor belt of claim 19, wherein the internal stretch limiter is disposed in a sinusoidal pattern along the lateral centerline of the belt.

22. The conveyor belt of claim 19, wherein the internal stretch limiter comprises woven fabric.

23. The conveyor belt of claim 19, further comprising, an intermediate rubber layer, positioned adjacent to the internal stretch limiter.

24. The conveyor belt of claim 19, wherein the intermediate layer comprises vulcanizable rubber.

25. The conveyor belt of claim 19, wherein angle C is equal to angle D.

26. The conveyor belt of claim 19, wherein angle C is not equal to angle D.

27. The conveyor belt of claim 19, wherein the angles C and D are approximately 15°.

28. The conveyor belt of claim 19, wherein the width of the first cord layer is greater than that of the second, third and fourth cord layers, the excess width of the first layer being wrapped above the second, third and fourth layers.

29. The conveyor belt of claim 19, further comprising an elongated elastomeric body having spaced-apart edges, edge portions along the edges, a load-carrying top belt surface on one side of the body extending between the edges and a drivable bottom belt surface on the other side of the body, extending between the edges.

30. The conveyor belt of claim 29, wherein the elongated body is comprised of vulcanizable rubber.

31. A flexible conveyor belt, comprising:

a first layer of rubber material;

a first cord layer disposed adjacent to the first rubber layer and comprising two oppositely biased first cord members which abut each other at the lateral centerline of the belt, with one first cord member on one side of the lateral centerline of the belt biased at an angle A with the lateral axis of the belt, and the other first cord member biased at an angle −A with the lateral axis of the belt;

a second cord layer disposed on the side of the first cord layer opposite to the first rubber layer and comprising two oppositely biased second cord members abutting each other at the lateral centerline of the belt, with one second cord member on the one side of the centerline of the belt biased at an angle −B with the lateral axis of the belt, and the other second cord member biased at an angle B with the lateral axis of the belt;

an internal stretch limiter oriented along the lateral centerline of the belt adjacent to first cord layer and having the property of stretching a predetermined distance when subject to tension and then having a rapidly increasing resistance to further elongation of the belt in operation;

intermediate rubber layer, positioned adjacent to the internal stretch limiter;

a third cord layer disposed between said second cord layer and said second rubber layer and comprising two oppositely biased third cord members abutting each other at the lateral centerline of the belt with one third cord member on the one side of the centerline of the belt biased at an angle C with the lateral axis of the belt and the other third cord member biased at an angle −C with the lateral axis of the belt; and a fourth cord layer disposed between the third cord layer and the second rubber layer comprising two oppositely biased fourth cord members abutting each other at the lateral centerline of the belt with one fourth cord member on the one side of the centerline of the belt biased at an angle −D with the lateral axis of the belt and the other fourth cord member biased at an angle D with the lateral axis of the belt;

an elongated elastomeric body having spaced-apart edges, edge portions along the edges, a load-carrying top belt surface on one side of the body extending between the edges and a drivable bottom belt surface on the other side of the body, extending between the edges.

32. A flexible conveyor belt, comprising:

a first layer of rubber material;

a first cord layer disposed adjacent to the first rubber layer and comprising two oppositely biased first cord members the ends of which contact each other at the lateral centerline of the belt, with one first cord member on one side of the lateral centerline of the belt biased at an angle A of approximately 15° with the lateral axis of the belt, and the other first cord member biased at an angle −A with the lateral axis of the belt; and a second layer of rubber material disposed on the opposite side of said first cord layer than said first rubber layer.

* * * * *